(12) United States Patent
Sakamoto et al.

(10) Patent No.: US 6,282,382 B1
(45) Date of Patent: *Aug. 28, 2001

(54) CAMERA HAVING COMPACT LAYOUT

(75) Inventors: Takamasa Sakamoto, Sakai; Junichi Tanii, Izumi, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,077

(22) Filed: Sep. 24, 1998

(30) Foreign Application Priority Data

Sep. 29, 1997 (JP) .................................................. 9-264167

(51) Int. Cl.7 ................................................... G03B 17/02
(52) U.S. Cl. ........................... 396/538; 396/535; 396/539
(58) Field of Search ................................. 396/535, 538, 396/539, 411, 412, 418

(56) References Cited

U.S. PATENT DOCUMENTS

| | | | |
|---|---|---|---|
| 2,989,906 | * | 7/1961 | Rentschler ............................ 396/539 |
| 3,096,699 | * | 7/1963 | Harvey et al. .................... 396/535 X |
| 3,988,751 | * | 10/1976 | Goto .................................. 396/539 X |
| 4,062,028 | * | 12/1977 | Tezuka et al. ....................... 396/535 |
| 4,274,726 | * | 6/1981 | Yoneyama et al. .................. 396/415 |
| 5,708,896 | * | 1/1998 | Machida ............................... 396/535 |
| 5,870,645 | * | 2/1999 | Tanbara et al. ...................... 396/539 |

* cited by examiner

*Primary Examiner*—Alan A. Mathews
(74) *Attorney, Agent, or Firm*—Morrison & Foerster LLP (57) ABSTRACT

In a small camera having multiple functions, a large internal component such as a battery is designed so as to protrude above the top cover flat surface of the camera and the protruding part is covered by an operational cover component such a dial for controlling exposure or other functions of the camera. By having this large internal component located at least partially inside the take-up spool, for example, the height of the camera grip is reduced and the camera as a whole is made smaller.

17 Claims, 13 Drawing Sheets

CAMERA HAVING COMPACT LAYOUT

This application is based on application No.9-264167 filed in Japan, the content of which is hereby incorporated by reference.

FIELD OF THE INVENTION

This invention pertains to a camera and to a layout of components in a camera to make it more compact.

BACKGROUND OF THE INVENTION

In recent years, cameras have acquired an increasing number of functions and many operations have become automated so that the camera may be easily operated by the average user. Because the capacities of the camera's battery and condenser and the power of the motor have had to be increased accordingly, these large internal components have become larger in size. Conversely, however, due to the high demand for smaller cameras, it has become necessary to design the layout of components so that the outer dimensions of the camera reflect a more efficient use of internal space.

Figure 1:
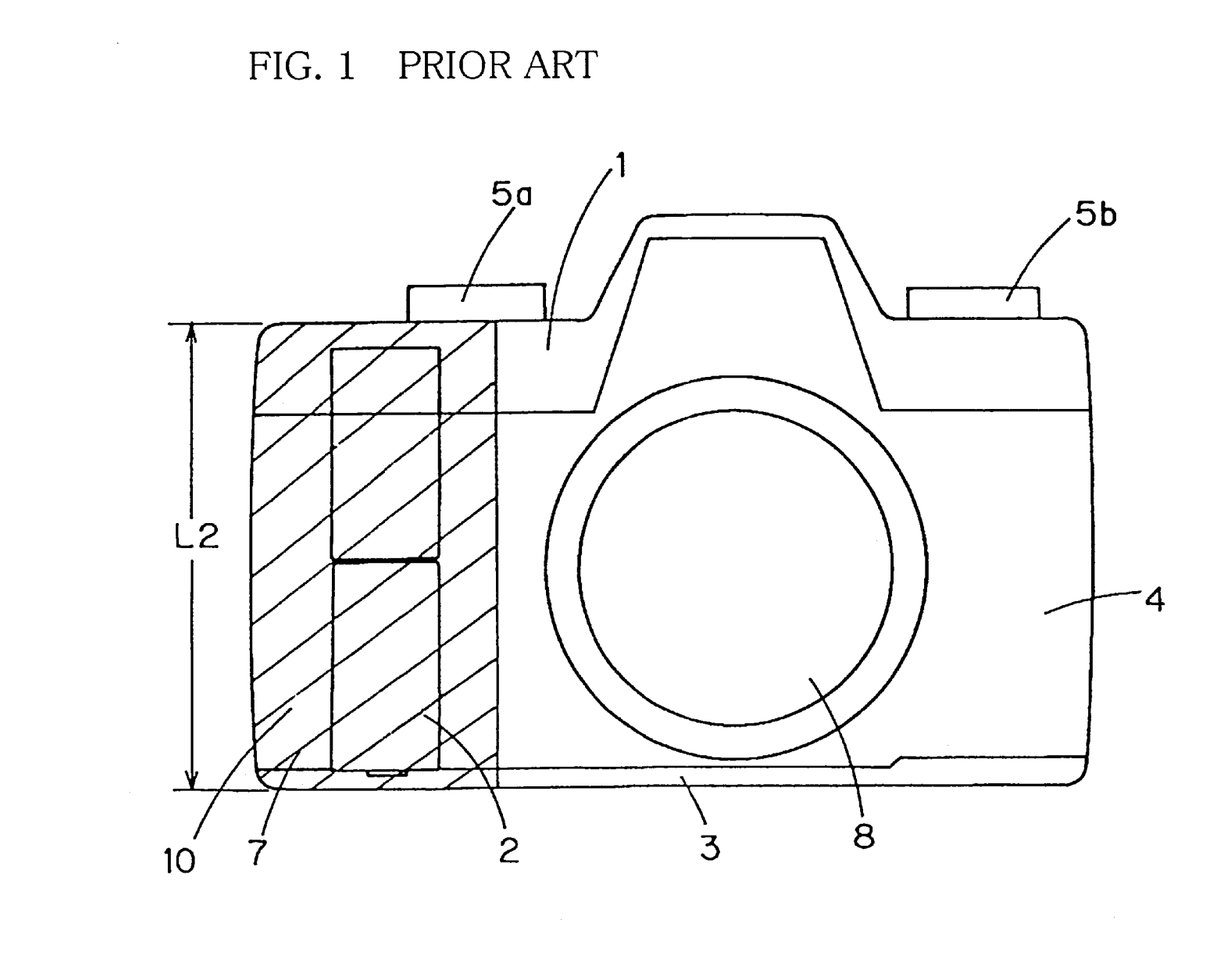
FIG. 1 is a front elevation of the construction of a conventional camera.

An example of the construction of a conventional camera is shown in FIG. 1. A camera body is ordinarily covered by a top cover 1, a bottom cover 3, a front cover 4, a grip cover 7 and a rear door not shown in the drawing. A lens unit 8 protrudes from the front cover 4, and dials 5a and 5b that perform exposure mode selection and exposure correction are located such that they protrude from the top cover 1. Two batteries 2 (typically of the kind having the trade designation CR123A) are often housed inside a grip 10 (indicated by diagonal line shading in the drawing) in series, and a motor, flash unit, etc., not shown in the drawing are driven by means of these batteries.

In a camera having this construction, the height L2 of the grip 10 is more or less determined by the combined lengths of the two batteries 2, and the extent to winch the camera size can be reduced along the grip height dimension is limited In order to avoid this limitation, a method using small CR2 batteries as the batteries 2 has been developed, but because these batteries have a smaller capacity and are more expensive than CR123A batteries, the use of CR123A batteries is preferred. A method has also been considered to install the two batteries side by side, but this increases the space that the batteries occupy along the width of the camera, again limiting the extent to which its size can be reduced.

Japanese Laid-Open Patent Application No. 60-217351-A discloses a camera using disk cartridge film and having a construction in which the cartridge protrudes tom the camera body. The protruding part is the cartridge bay cover and has no operational function as a part of the camera other than to cover the cartridge.

SUMMARY OF THE INVENTION

This invention provides an arrangement of internal camera components in a space-efficient manner so that the outer dimensions of the camera may be reduced. As is described further below, in a camera having large internal components such as batteries, a condenser and/or a motor housed inside the camera, the space on the camera surface may be efficiently utilized, the height of the grip may be reduced, and the camera as a whole may be made smaller.

The invention also provides the feature that by having any of the large internal components and supplementary components connected with such large internal components to support them or to pride functions in addition to those provided by the large internal components protrude above the top surface of the camera, the space within the camera body that would be occupied by the supplementary components may be moved to the outside of the grip, thus further reducing the height of the grip. By positioning any of these large internal components either inside the film take-up spool or next to the spool compartment, it becomes easier to mount the cover component, and the battery cover can be made thin.

The invention also provides the ability to reduce the amount of dead space by having the cover component that covers the large component internal protruding above the top surface of the camera be a rotatable operation member which controls or performs some camera function beyond merely acting as a cover for the large internal component.

Finally, by having any of said large components oriented essentially parallel to the film take-up spool, the existence of dead space can be prevented.

These and other features, objects and advantages can be realized from the invention as described in greater detail below and from the appended claims.

DETAILED DESCRIPTION OF THE INVENTION

Figure 2:
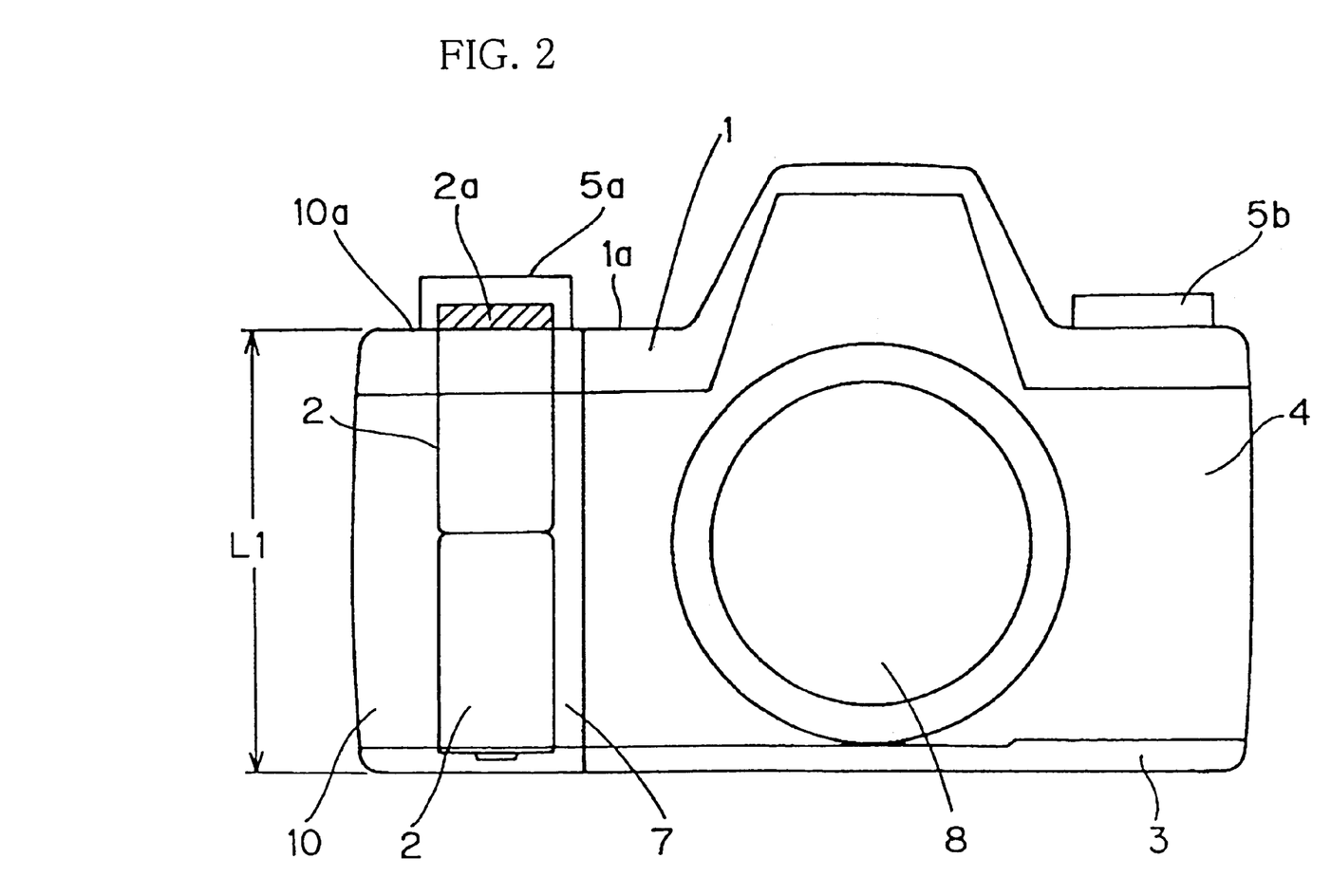
FIG. 2 is a front elevation of the construction of the camera of a first embodiment of the invention.
Figure 3:
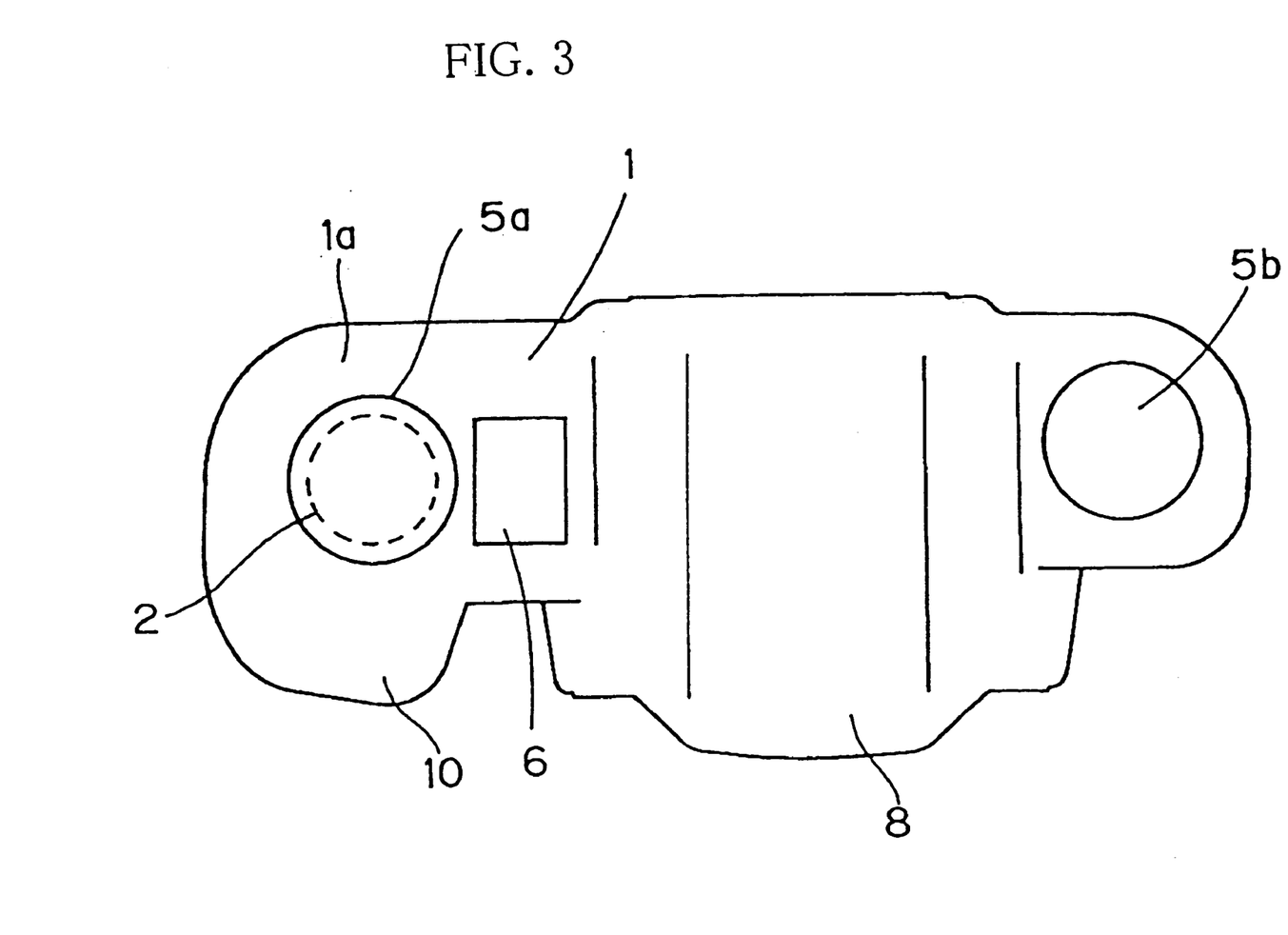
FIG. 3 is a top view of the construction of the camera of FIG. 2.

Embodiments of the present invention will be explained below with reference to the drawings. Parts identical to those in the conventional example (FIG. 1) have the same numbers. As shown in FIGS. 2 and 3, cover components such as rotating dials 5a and 5b and a display member 6 that performs exposure display are located on a top cover 1, and the dial 5a covers the batteries 2 that protrude above the surface 1a of the flat part of the top cover 1 (hereinafter the "top cover flat surface"). Because the dial 5a already protrudes above the top cover flat surface 1a as explained with reference to the conventional example, there is no significant difference in the design appearance. By having part of the batteries 2 (the top part) protrude from the top cover 1 and employing a construction in which the part that protrudes is contained inside the dial 5a, the height L1 of the grip 10 can be reduced relative to the conventional example and the outer dimensions of the camera as a whole may be reduced.

Figure 4:
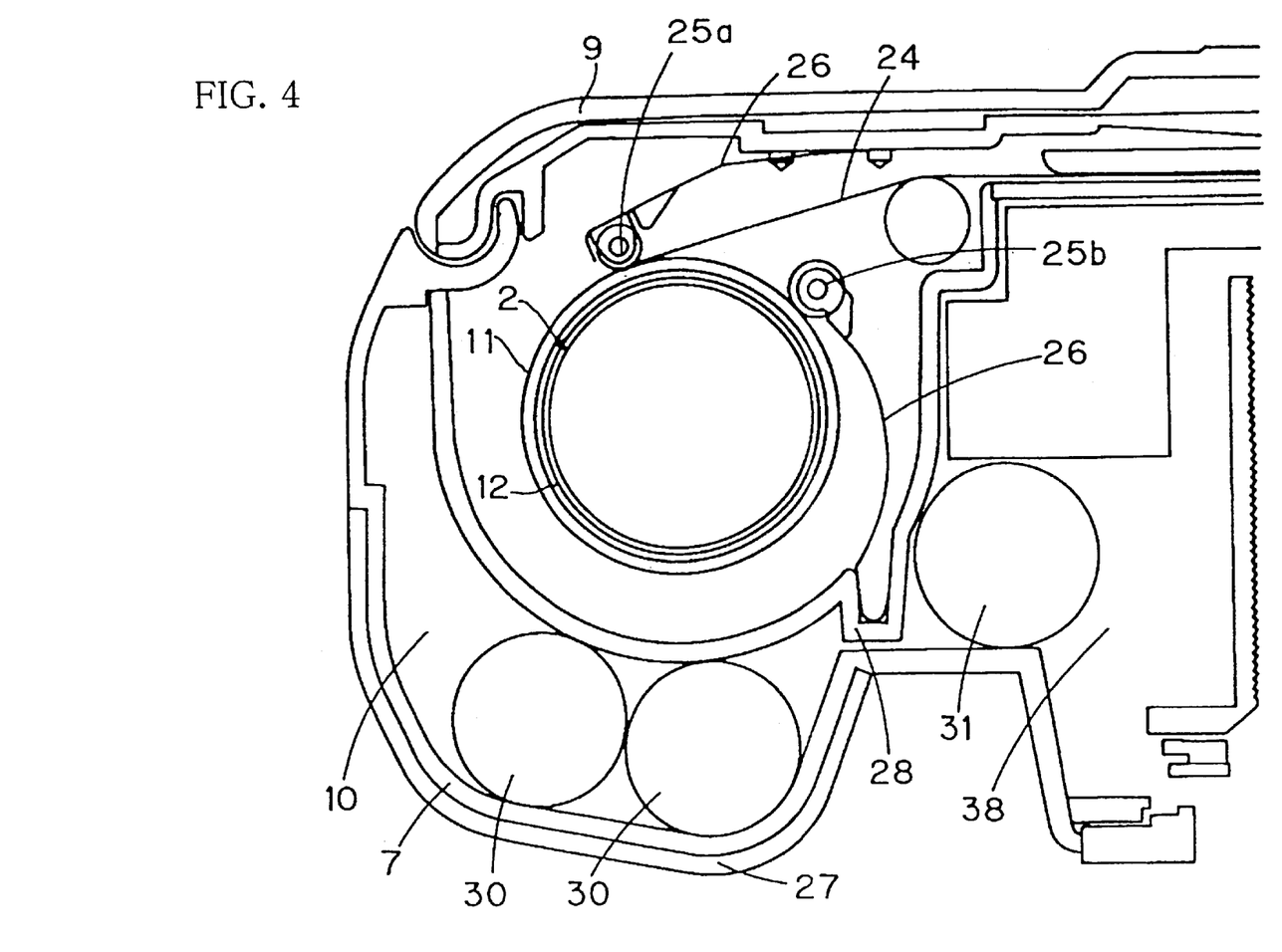
FIG. 4 is a transverse cross-section showing the details of the construction of the camera of FIG. 2.
Figure 5:
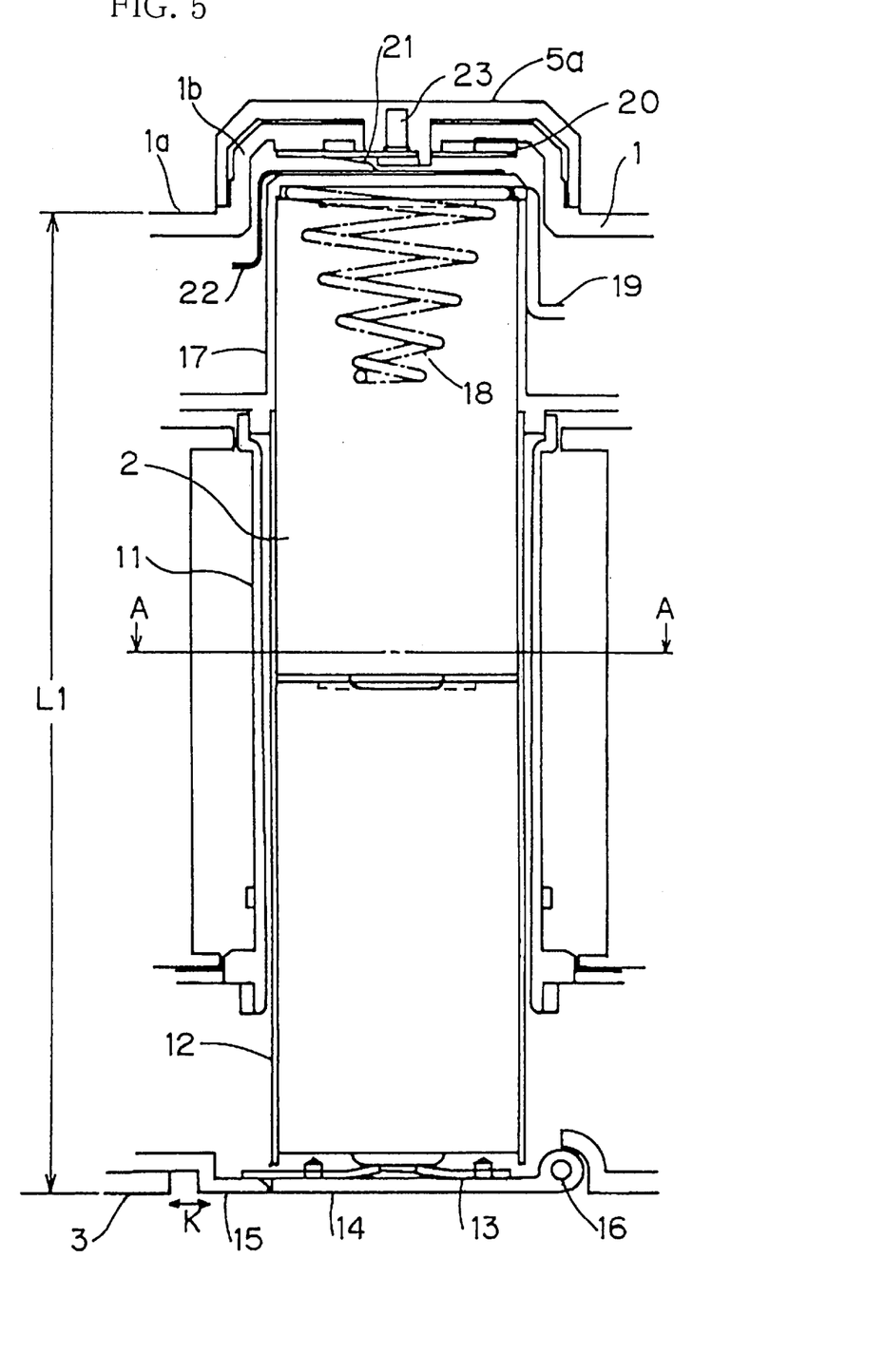
FIG. 5 is a vertical cross-section showing the details of the construction of the camera of FIG. 2.

A more detailed explanation will now be provided with reference to FIGS. 4 and 5. FIG. 5 is a vertical cross-section in which the battery housing area of this embodiment is enlarge, and FIG. 4 is a transverse cross-section cut along the A—A line of FIG. 5. In the part shown in FIG. 4, the outer part of the camera body comprises a grip cover 7 and a rear door 9. A rubber grip 27 to prevent the user's hand from slipping off the camera is affixed to grip cover 7. In order to hold the front part of the camera body together firmly when rear door 9 is open, the exterior of the front part of the camera body is constructed such that it includes a body 28 incorporated inside the grip cover 7 and the front cover of the camera, which is not shown in the FIG. 4 but can be seen in FIG. 2.

Condensers 30 are located in the front part of grip 10, and accumulate electricity for a flash unit not shown in the drawing. Rotatable spool 11, which is supported by body 28 at its top and bottom such that it can take in film 24, is located in the rear part of the grip 10, and the film 24 is pressed down by means of film pressure members 25a and 25b connected to the body 28 and rear door 9 by means of plate springs 26. The interior of the spool 11 is an empty space, in which non-rotating internal cylinder 12 is formed to house batteries 2 so that it does not interfere with spool 11. Motor 31 can be located in area 38 next to grip 10, and winding and rewinding of film 24 are cared out by motor 31 via a reduction mechanism and various other gears not shown in the drawings.

FIG. 5 shows battery cover 14, to which positive electrode 13 is fixed, and which is attached to bottom cover 3 through hinge 16, and lock 15 for battery cover 14 is mounted to the bottom cover 3 as well such that it can slide in the direction of arrow K. A pressure spring 18 that comes into contact with the negative terminal of battery 2 and is connected to a negative electrode 19 is fixed to the upper inner surface of internal cylinder 17 that is supported in body 28 and houses the top part of battery 2. Dial 5a is rotatably mounted to the protruding part 1b of the top cover 1 (hereinafter the "top cover protruding part"). Click plate 20 and dial 5a are joined together by rivet 23. A detection piece 21 is formed on click plate 20, and the position of dial 5a is detected based on the contact between it and a dial base plate 22 attached to the top outer surface of inner cylinder 17.

As described above, by locating not only the batteries 2 but also the supplementary members needed to house and use the batteries 2, such as the pressure spring 18 and the negative electrode 19, such that they protrude above the top cover flat surface 1a, the space that these supplementary members occupy can be moved to a position outside grip 10, and consequently grip height L1 can be reduced. Top cover 1 in the area covering upward protruding battery 2 and supplementary members 18 and 19 is formed so as to protrude above the top cover flat surface 1a, and an operation member is constructed using the dial 5a that is rotatably located so as to cover this top cover protruding part 1b. By having the top cover 1 form a part of the dial 5a, which acts as an operation member for the camera to carry out functions such as exposure connection or selection of exposure mode, this embodiment may be realized without increasing the number of components over the conventional model. The operation member can also be a sliding-type member in this type of construction and produce the same advantages, but because the cross-sectional configuration of the battery 2 is round, the construction in which the operation member rotates is preferable because it reduces the amount of dead space.

Figure 6:
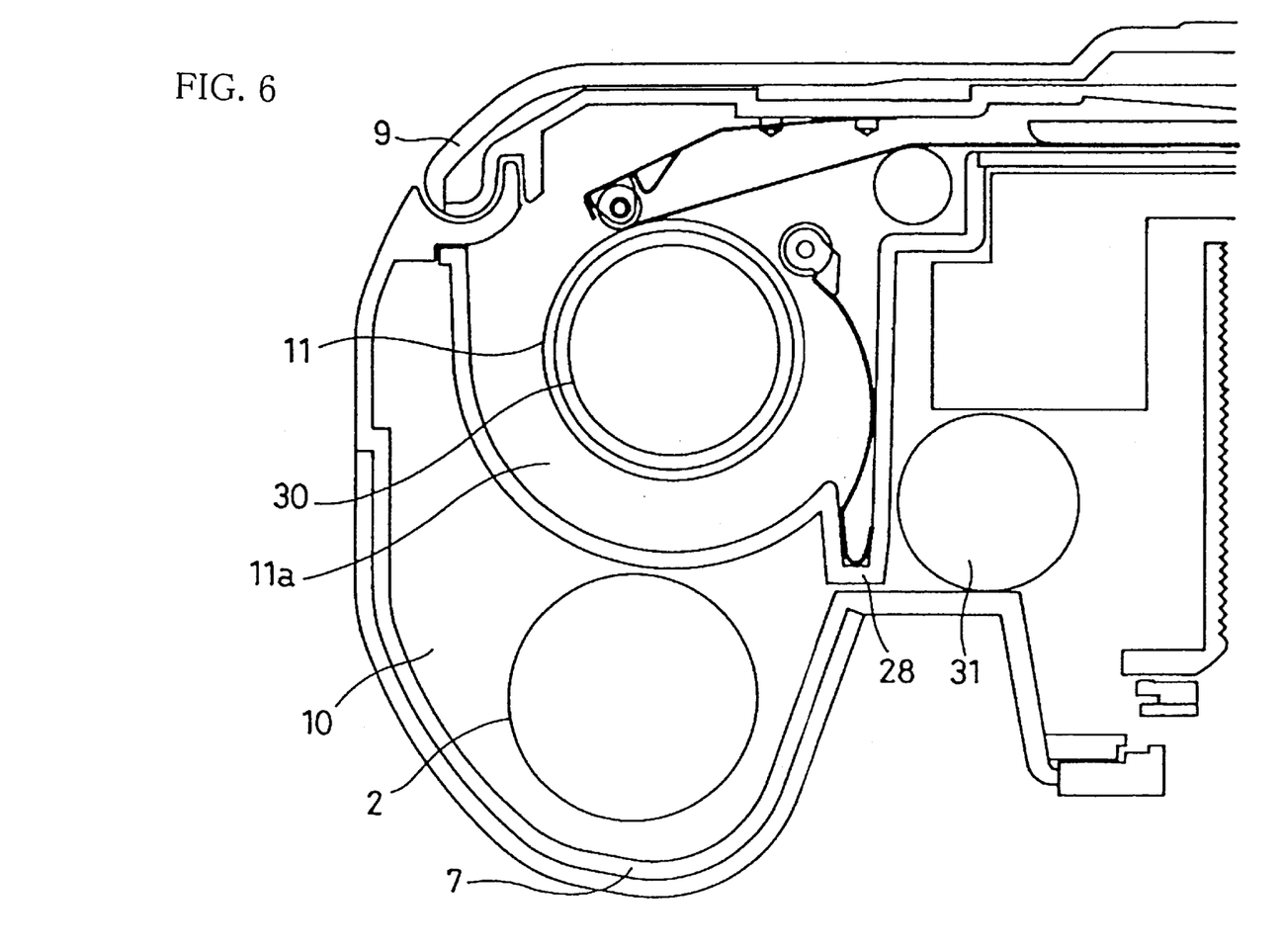
FIG. 6 is a transverse cross-section showing the details of a second embodiment of the invention.
Figure 7:
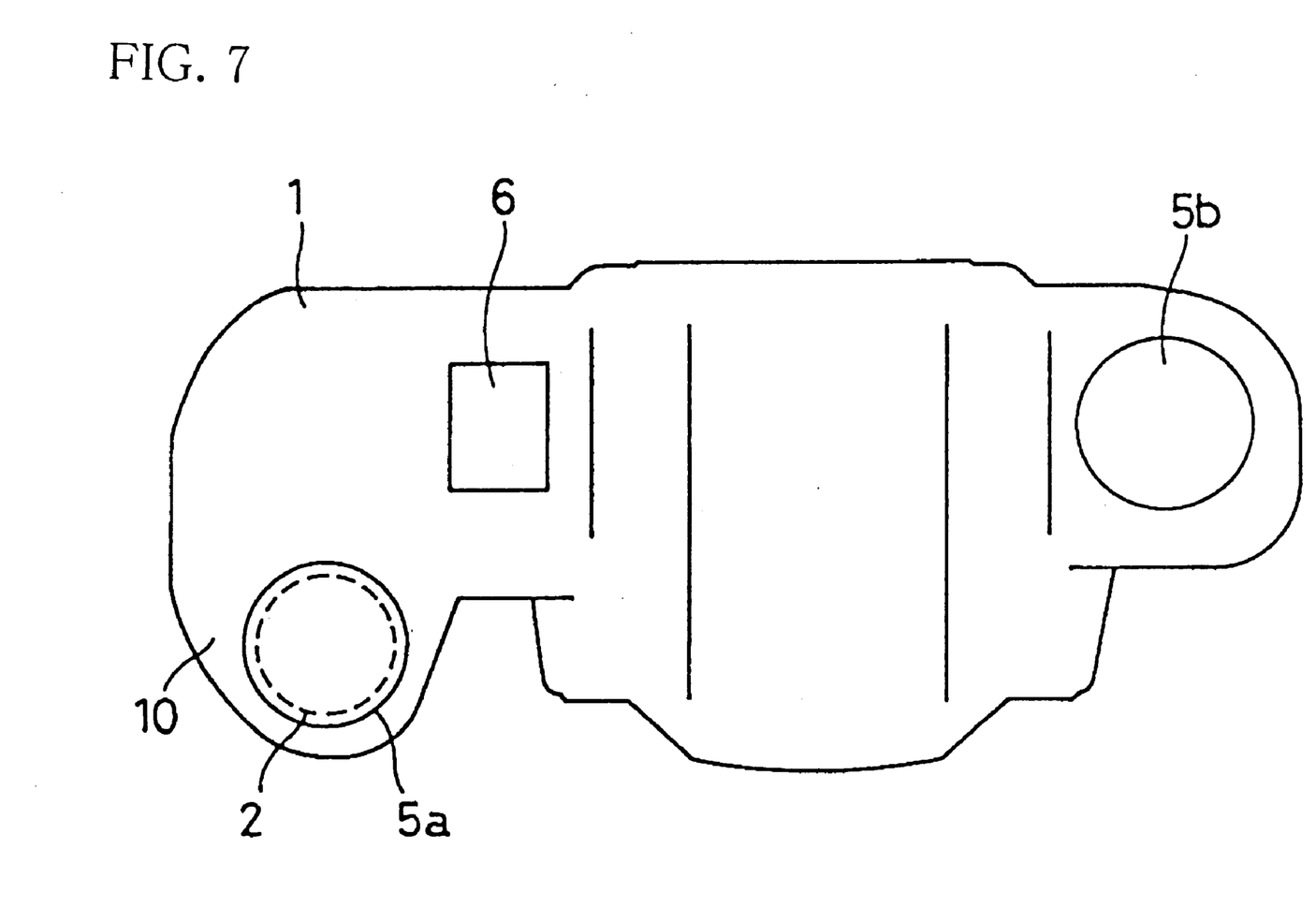
FIG. 7 is a top view of the camera construction of FIG. 6.
Figure 15:
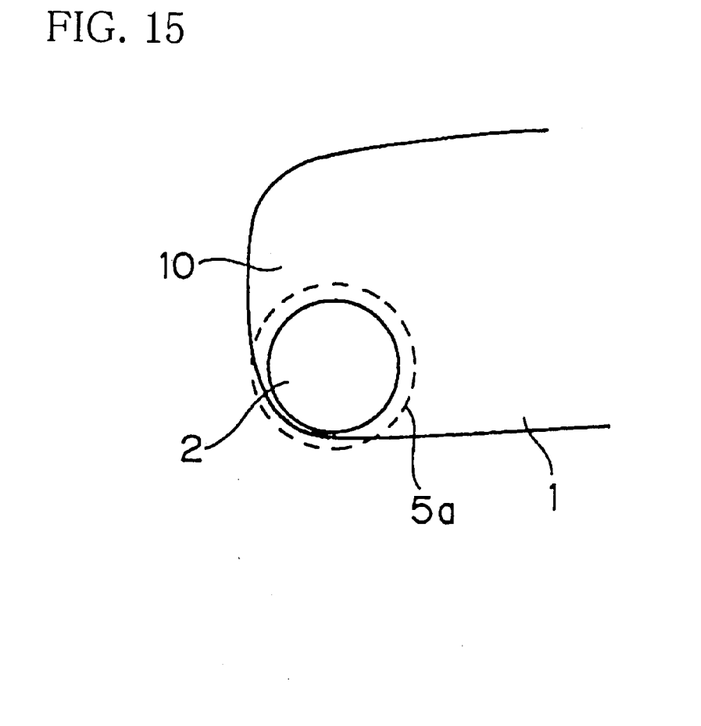
FIG. 15 is a drawing to explain the suitability of various positions at which a large internal component may be housed within the camera of this invention.
Figure 16A:
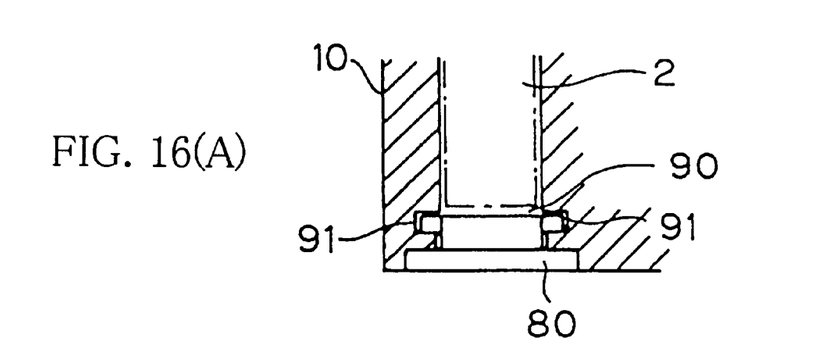
FIGS. 16(A) and 16(B) are additional drawings to explain the suitability of various positions at which a large internal component may be housed within the camera of this invention.
Figure 16B:
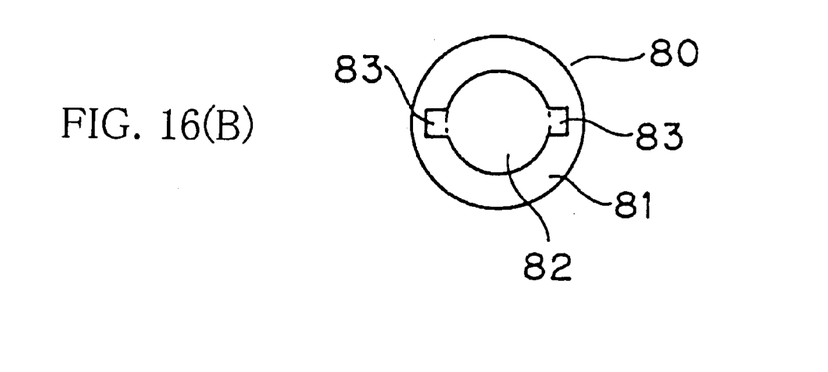

The batteries 2 need not be located inside the spool 11, and may be located at a different position. For example, FIG. 6 shows a transverse cross-section of a second embodiment in which the batteries 2 are located adjacent to the outside of the spool compartment 11a and are aligned end-to-end so that their longitudinal axes lie in a direction parallel to the rotational axis of the spool 11. The batteries 2 are oriented parallel to the rotational axis of the spool 11 because this minimizes the amount of dead space that would exist at the tops and bottoms of the batteries if they were tilted. The top surface of the camera is shown in FIG. 7 is arranged so that the dial 5a is located at the front part of the grip 10 and performs camera operations. The batteries 2 may be located in positions other than those provided in the first or second embodiments, but it is preferable for the batteries 2 to be located either in the spool 11 or adjacent to the outside of the spool compartment 11a because doing so involves minimal changes to the design appearance of the camera due to the fact that the batteries 2 are housed inside the grip 10 that protrudes outward from the front of the camera However, where the batteries 2 are located extremely close to the edge of the grip 10 as shown in the simplified plan view of FIG. 15, the dial 5a extends beyond the outer edge of the camera as seen from the top (indicated by the dashed line) because its diameter is larger than that of the batteries 2, which raises the risk that the user will easily touch it with his hand when holding it, causing erroneous operation. In addition, because the space for the lock 15 for the battery cover cannot be reduced, it is difficult to use the cover 14 shown in FIG. 5. Consequently, as shown in FIG. 16, the housing compartment for the batteries 2 is closed using a cylindrical double cover 80, but here the cover 80 has to be thick. For this reason, a construction in which the batteries 2 are located at the extreme edge of the grip 10 is not preferred As shown in FIGS. 16(A) and (B) 81 is a large cylindrical shaft, 82 is a small cylindrical shaft, and 83 are stoppers, and these stoppers engage with notches 91 formed in a hole 90. When the cover 80 is to be removed from the camera body, the cover 80 is rotated, for example, 90 degrees from its position in the drawing, and retracted downward.

Where the camera construction is made smaller using CR2 batteries as the batteries 2, or where a large-capacity condenser 30 or a more powerful motor 31 is necessary, the component that determines the height of the grip 10 may be the condenser 30 or the motor 31 instead of the batteries 2. In this case, the condenser 30 or the motor 31 will protrude above the top cover flat surface 1a, as disclosed in the third and fourth embodiments shown in FIGS. 8 and 9. In FIG. 9, reduction mechanism 32 transmits the rotation of the motor 31 while reducing its speed.

Figure 8:
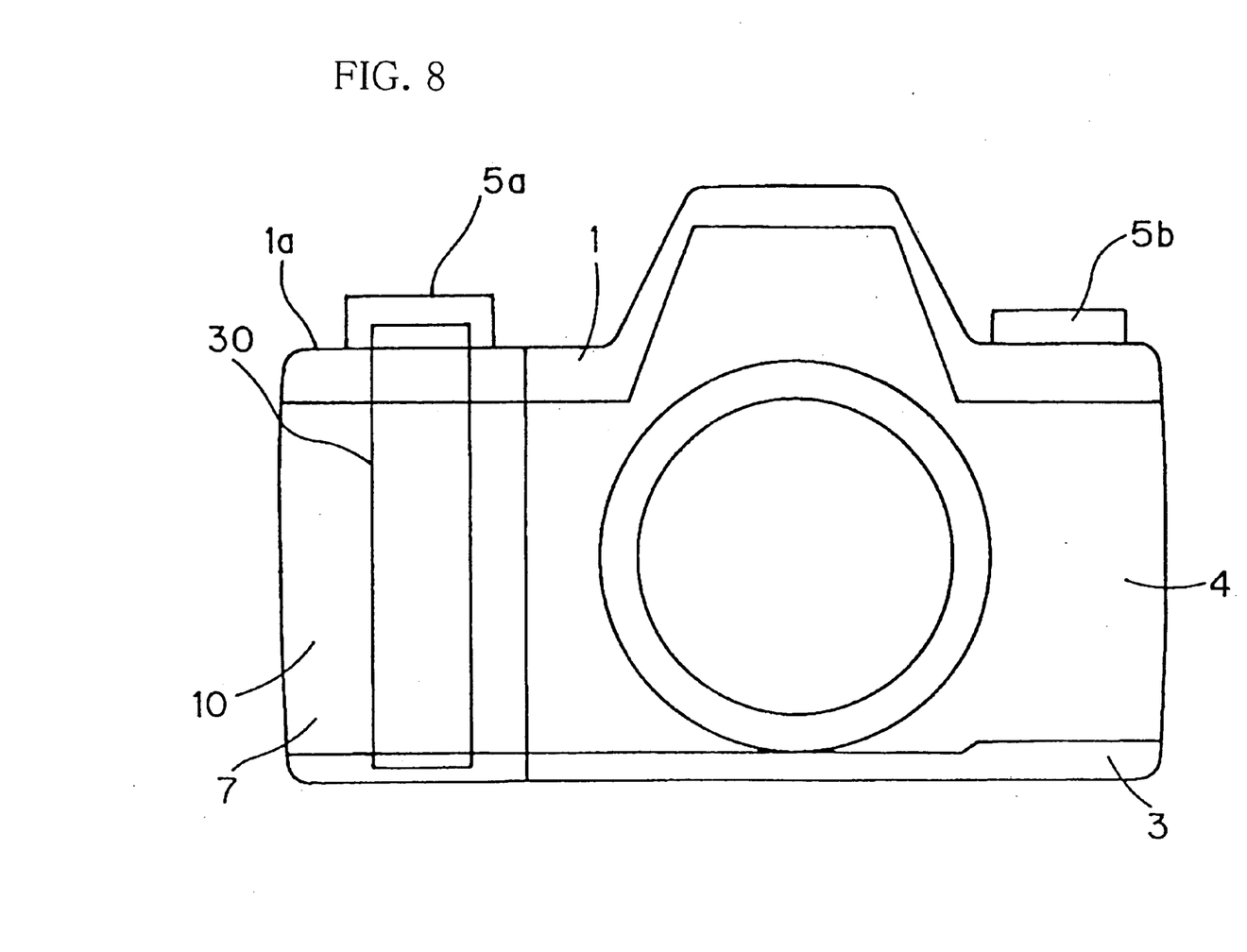
FIG. 8 is a front elevation of a third embodiment of the invention.
Figure 9:
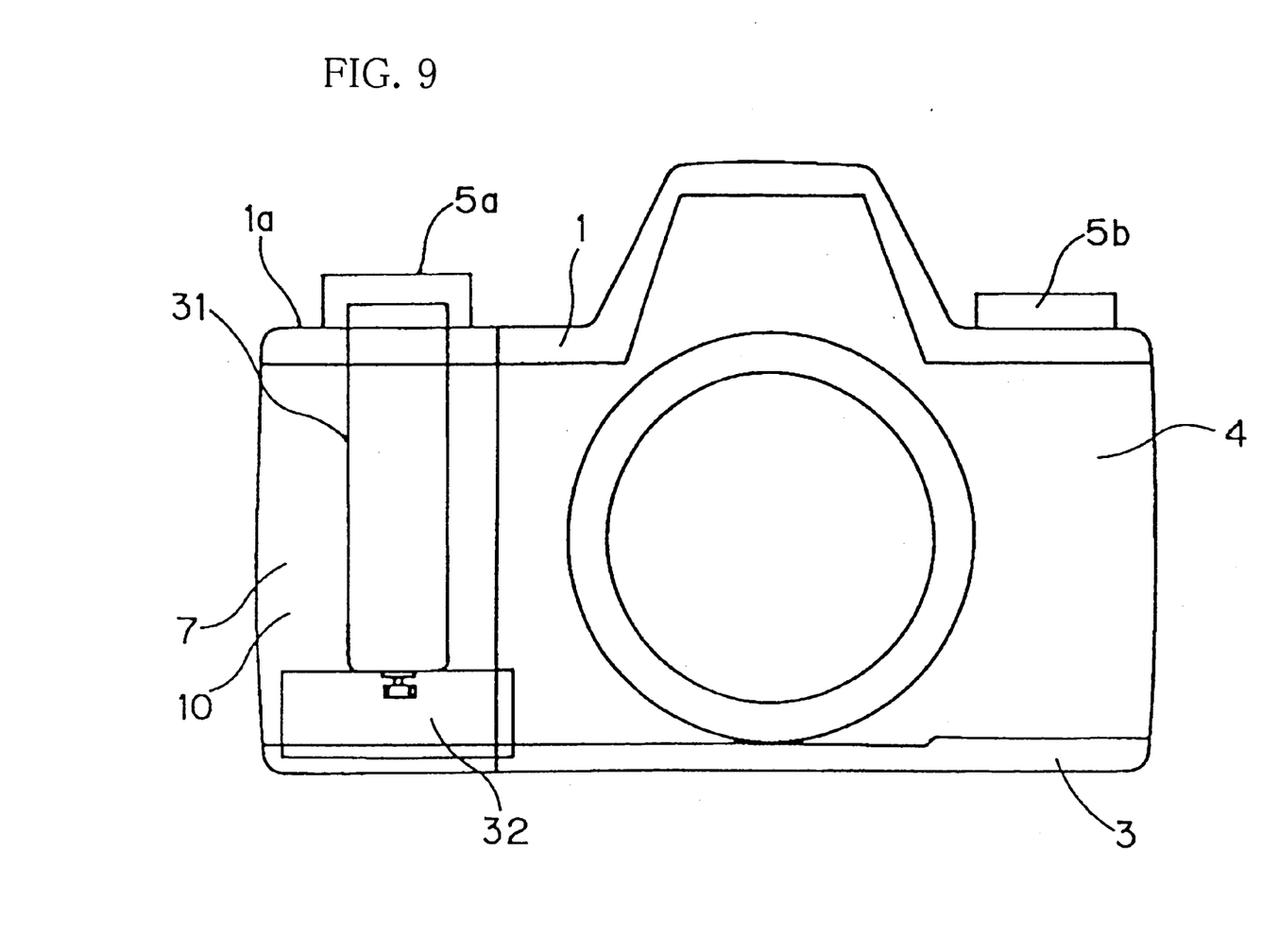
FIG. 9 is a front elevation of a fourth embodiment of the invention.
Figure 10:
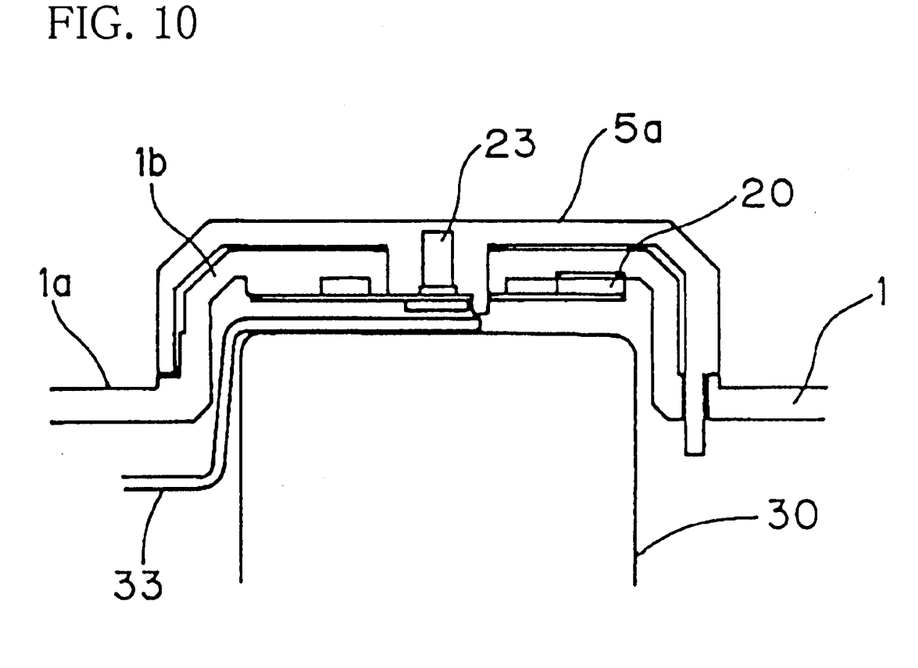
FIG. 10 is a vertical cross-section showing details of the camera of FIG. 8.
Figure 11:
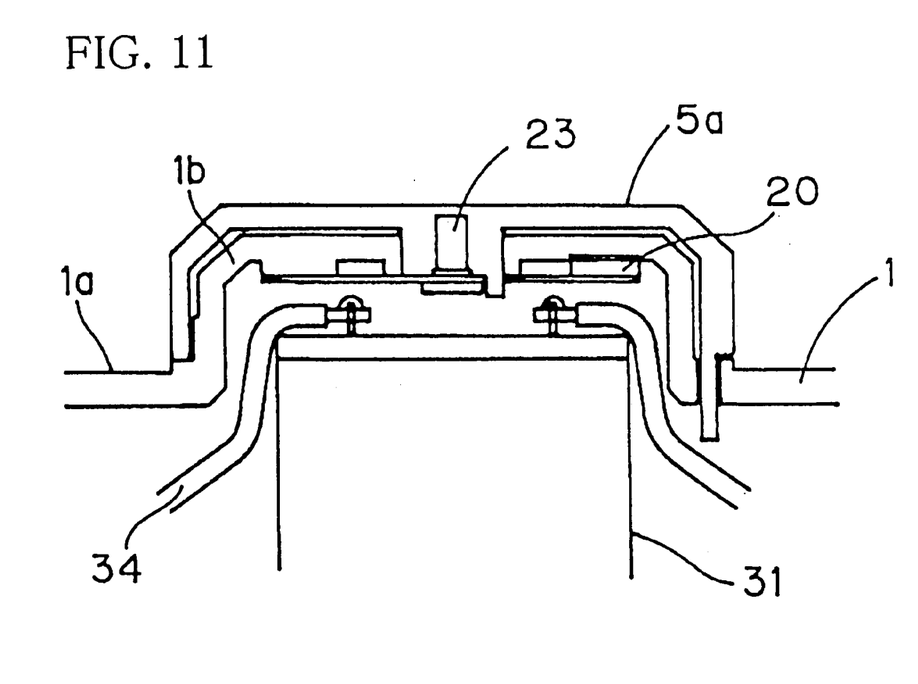
FIG. 11 is a vertical cross-section showing details of the camera of FIG. 9.
Figure 12:
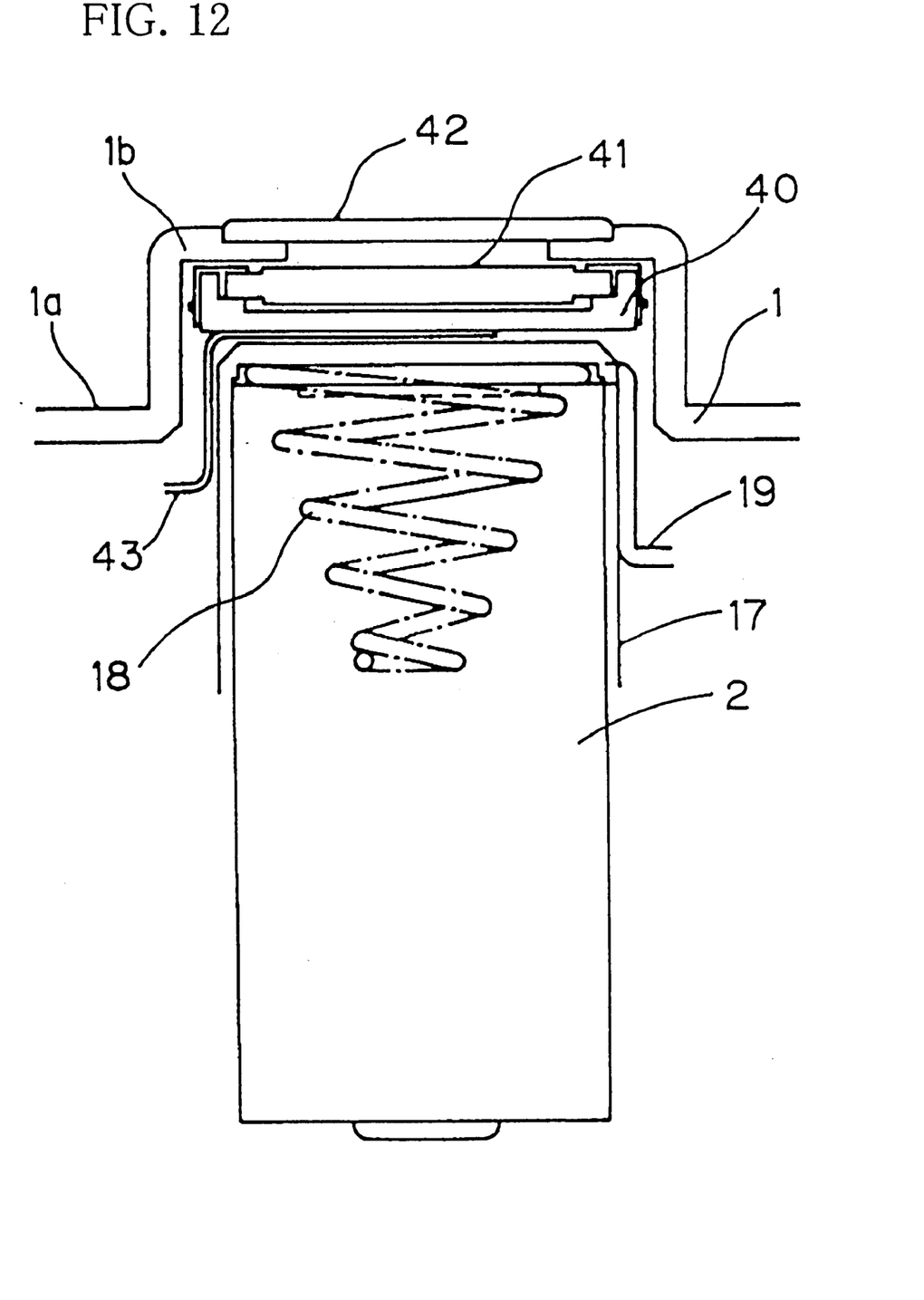
FIG. 12 is a vertical cross-section showing the details of a fifth embodiment of the invention.
Figure 13:
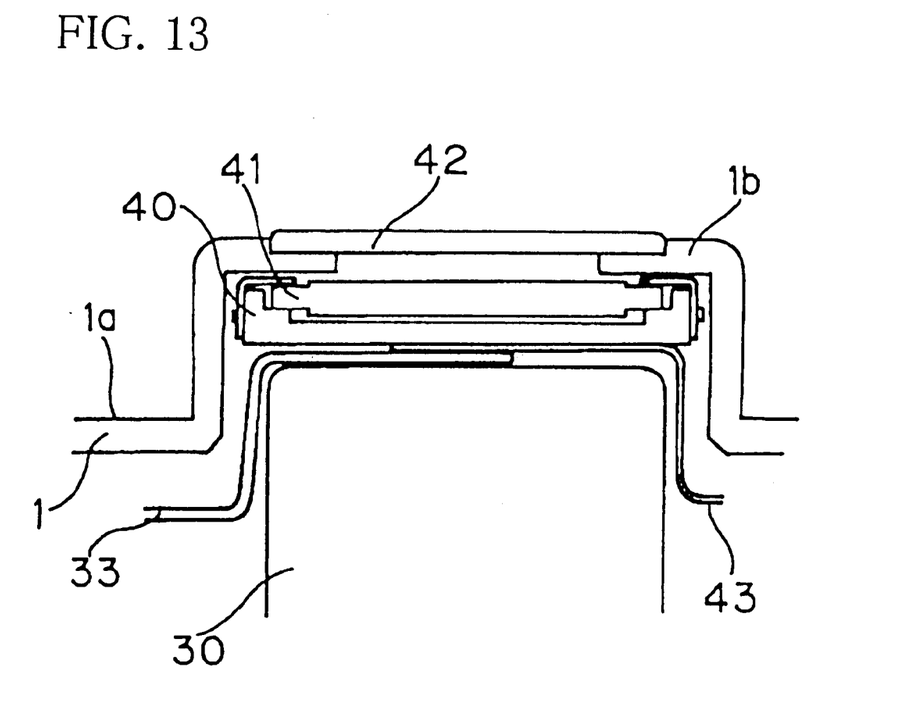
FIG. 13 is a vertical cross-section showing the details of a sixth embodiment of the invention.
Figure 14:
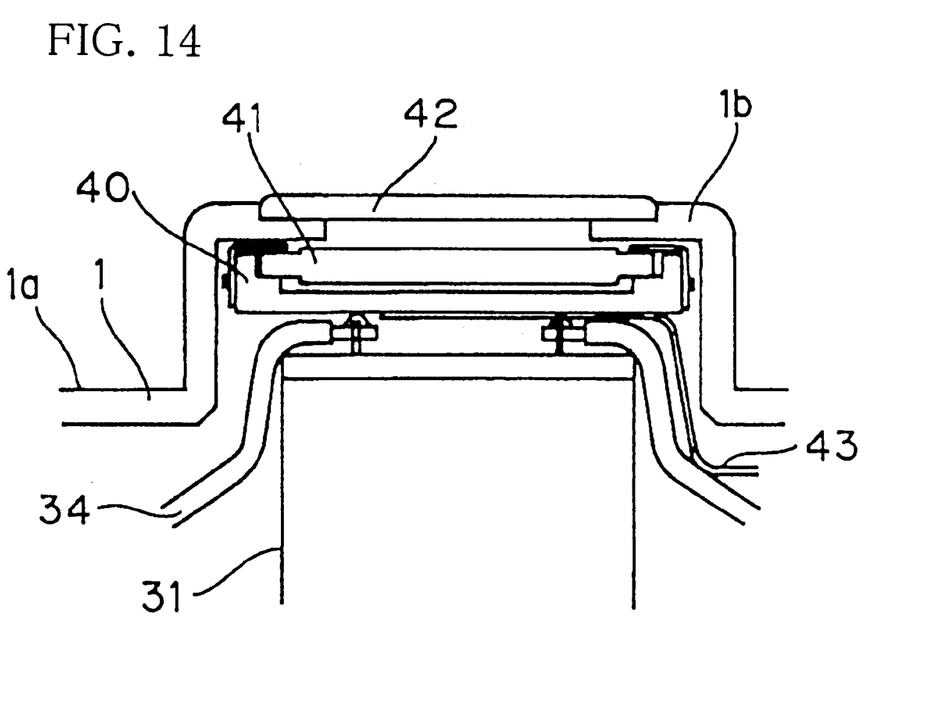
FIG. 14 is a vertical cross-section showing the details of a seventh embodiment of the invention.

The constructions of the important parts of FIGS. 8 and 9 are shown in FIGS. 10 and 11. In FIG. 10, the condenser 30 and the condenser electrode 33, which is a supplementary component to the condenser 30, protrude above the top cover flat surface 1a. In FIG. 11, the motor 31 and the motor lead wires 34, which are supplementary components of the motor 31, protrude above the top cover flat surface 1a. In each case, the dial 5a is rotatably mounted to the top cover protruding part 1b. In this way, as in the previous embodiments, by having not just the batteries 2 but also other large components and their supplementary components protrude above the top cover flat surface 1a, the height of the grip 10 can be reduced and the camera can be made smaller.

Where the mounting of the dial 5a is not necessary, or where it is mounted elsewhere on the camera, a display member comprising an LCD 41, an LCD holder 40, an LCD display window 42 and an LCD base plate 43 may be mounted instead, as disclosed by the fifth through seventh embodiments shown in FIGS. 12 through 14. The space on the top surface of the camera can be efficiently used by covering the large component and its supplementary components by these cover components or by the top cover protruding part 1b formed as a single unit with these cover components, the grip height L1 can be reduced in the same manner as described above, and the camera may be made smaller in size. The fifth embodiment shown in FIG. 12 corresponds to the embodiment pertaining to the battery housing area shown in FIG. 5, and the same numbers are used for those parts that are identical to those used in FIG. 5 Similarly, the sixth embodiment shown in FIG. 13 corresponds to the condenser housing area shown in FIG. 10, and the seventh embodiment shown in FIG. 14 corresponds to the motor housing area shown in FIG. 11.

In these embodiments, the top cover protruding part 1b comprises a part of the cover component such as a display member or rotatable operation member, but a protruding area need not be formed on the top cover 1. It is acceptable if a hole is formed in the top cover flat surface 1a and the large component and its supplementary components are covered by attaching a cover component that is constructed independently.

Although this invention has been fully described by way of examples with reference to the accompanying drawings, it is to be noted that various changes, modifications and equivalents will be apparent to those skilled in the art. Therefore, unless such changes and modifications depart from the scope of this invention, they should be construed as being included herein.

What is claimed is:

1. A camera comprising:
   a camera body;
   a cover having a flat surface which covers the camera body;
   an operatively coupled cover component located over the flat surface of the cover; and
   an internal component that partially extends into a space between the operatively coupled cover component and the flat surface of the cover, and the operatively coupled cover component is operatively coupled to the camera or to the internal component to perform an operational function of the camera.

2. A camera claimed in claim 1, wherein said internal component is one or more of a battery, condenser or motor.

3. A camera claimed in claim 1, further comprising supplementary components attached to said internal component to support said internal component or to provide supplemental functions for said internal components.

4. A camera claimed in claim 1, wherein the portion of said internal component that extends into a space between the operatively coupled cover component and the flat surface of the cover has a cylindrical configuration and the operatively coupled cover component is a rotatable operation member.

5. A camera as claimed in claim 1, wherein the operatively coupled cover component is a display member.

6. A camera as claimed in claim 1, wherein said internal component is located adjacent to a film take-up spool compartment in said camera.

7. A camera as claimed in claim 6, wherein a longitudinal axis of said internal component is roughly parallel to the center rotational axis of the film take-up spool.

8. A camera as claimed in claim 1, wherein said internal component is located at least partly inside a film take-up spool.

9. A camera as claimed in claim 8, wherein a longitudinal axis of said internal component is roughly parallel to the center rotational axis of the film take-up-spool.

10. A camera claimed in claim 1, wherein said internal component is fixed to the camera body.

11. A camera claimed in claim 1, wherein the operatively coupled cover component further has a protruding part which covers the portion of the internal component that extends into a space between the operatively coupled cover component and the flat surface of the cover.

12. A camera claimed in claim 1, further comprising a movable cover which covers the opposite side of the camera body to said cover component.

13. A camera comprising:
   a cover having a flat surface which covers a camera body;
   an operatively coupled cover component located over the flat surface of the cover, wherein the operatively coupled cover component has a cylindrical configuration; and
   an internal component that partially extends into a space between the operatively coupled cover component and the flat surface of the cover, and wherein the operatively coupled cover component is operatively coupled to the camera or to the internal component to perform an operational function of the camera.

14. A camera as claimed in claim 13, wherein the operatively coupled cover component is a display member that displays prescribed information.

15. A camera as claimed in claim 13, wherein said internal component has a cylindrical configuration.

16. A camera as claimed in claim 15, wherein the operatively coupled cover component has a cylindrical configuration.

17. A camera comprising:
   a camera body;
   a cover having a flat surface and a protruding part which covers the camera body, wherein the protruding part is located over the flat surface;
   a movable cover which covers an opening positioned on a side of the camera body opposite the protruding part; and
   an internal component that partially extends into a space of the protruding part and is attachable and detachable to the camera body through the opening.

* * * * *